Nov. 16, 1943.  C. B. SCHAFER  2,334,651
APPARATUS FOR WASHING SHEET GLASS
Filed Jan. 25, 1941  2 Sheets-Sheet 1

Inventor
CONRAD B. SCHAFER.
By Frank Fraser
Attorney

Patented Nov. 16, 1943

2,334,651

UNITED STATES PATENT OFFICE 2,334,651

APPARATUS FOR WASHING SHEET GLASS

Conrad B. Schafer, Toledo, Ohio, assignor to Libbey-Owens-Ford Glass Company, Toledo, Ohio, a corporation of Ohio Application January 25, 1941, Serial No. 375,947

7 Claims. (Cl. 15—77)

The present invention relates broadly to the washing of sheet glass and more particularly to an apparatus for washing bent or curved sheets or plates of glass.

Although not limited to any specific use, this invention is of especial utility in the washing of glass sheets or plates which are to be used in the manufacture of bent or curved laminated safety glass. Briefly stated, laminated safety glass comprises two or more sheets of glass having one or more sheets of suitable plastic strengthening material interposed therebetween and bonded thereto to provide a composite structure. When manufacturing this type of glass, it is necessary that the glass sheets be thoroughly and carefully washed and cleaned before they can be satisfactorily united to the interposed sheet or sheets of plastic strengthening material. In the event the glass surfaces to be united are not perfectly clean and free from all dirt, dust and foreign matter, the bond between the laminations as well as the appearance of the finished composite sheet may be seriously affected.

The primary object of the invention is the provision of a novel apparatus for effecting a thorough and efficient washing of the glass sheets or plates which go into the making of bent or curved laminated safety glass, whereby to facilitate proper adhesion between the component parts of the laminated sheet and reduce to a minimum the percentage of rejects caused by insufficient and unsatisfactory cleaning of the glass.

Another important object of the invention is the provision of an apparatus of the above character wherein the washing of the bent or curved sheets or plates of glass may be accomplished rapidly and conveniently and without placing any strain upon the glass so that the liability of breakage thereof during washing is minimized.

Other objects and advantages of the invention will become more apparent during the course of the following description when taken in connection with the accompanying drawings.

In the drawings wherein like numerals are employed to designate like parts throughout the same:

Figure 1:
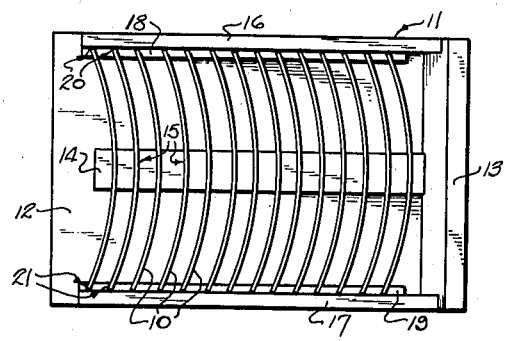
Fig. 1 is a plan view of a rack for supporting a plurality of the glass sheets or plates to be washed.

In carrying out the present invention, a plurality of bent or curved sheets or plates of glass 10 to be washed are initially supported on edge and in spaced parallel relation upon a suitable type rack such as the L rack shown in Fig. 1 and designated in its entirety by the numeral 11. This rack comprises a horizontal bottom 12 and a substantially vertical end member 13. To maintain the glass sheets on edge in vertical, substantially parallel relation, there is carried upon the bottom 12 of the rack, and substantially centrally thereof, a longitudinally extending strip member 14 preferably of hard rubber or the like and provided with a series of spaced transverse notches 15 for receiving the bottom edges of the glass sheets 10 therein. Secured to the end member 13 at opposite sides of the rack are side members 16 and 17 also carrying strips 18 and 19 respectively of hard rubber or the like provided with spaced notches 20 and 21 for receiving the opposite side edges of the glass sheets 10 therein. The bottom of the rack is preferably supported upon suitable feet 22 arranged at the four corners thereof.

Figure 2:
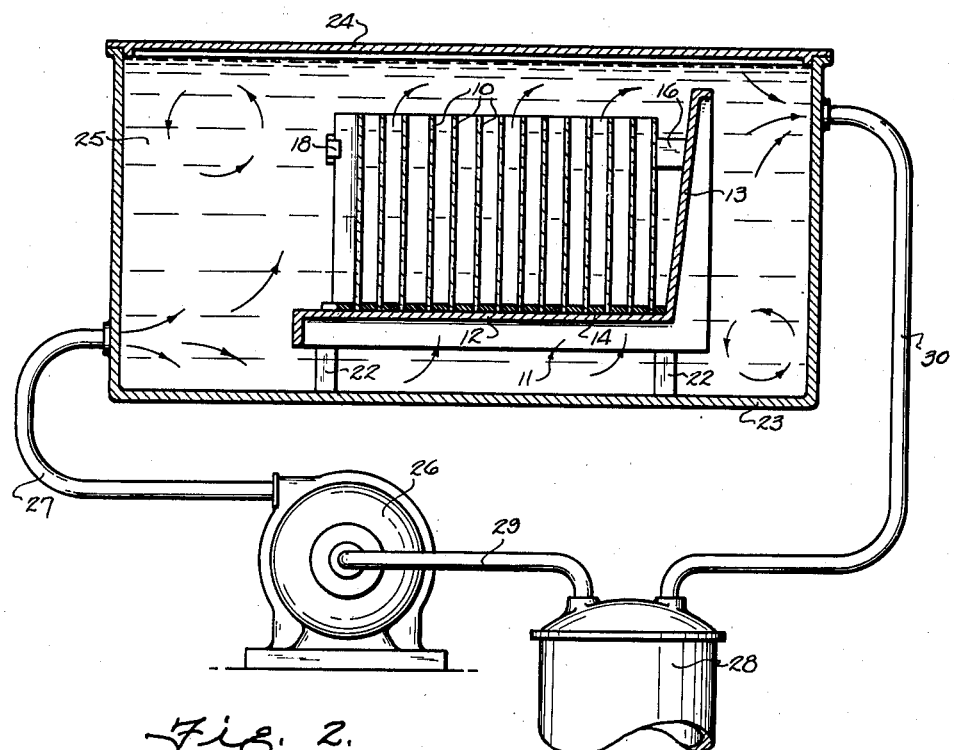
Fig. 2 is a vertical longitudinal sectional view through a washing tank for receiving the rack of Fig. 1 therein and in which the glass sheets carried by said rack are subjected to the initial washing operation.

After the glass sheets 10 have been cut to the proper size, they are positioned upon the L rack 11, as shown in Fig. 1, and the rack is then placed in a suitable tank 23 (Fig. 2) provided with a removable cover 24 and filled with a washing solution 25 in the nature of a detergent bath. The detergent bath may consist of any suitable type washing solution such as, for example, a mixture of water, soap, and a water softener (Calgon) to which may or may not be added a relatively small amount of soda ash, as preferred. The washing solution is circulated continuously through the tank 23 by means of a pump 26 which is connected with one end of the tank, preferably adjacent the bottom thereof, by a pipe 27 and also with a heating tank 28 through a pipe 29. The washing solution is pumped into the tank 23 in a manner to cause a turbulent agitating action therein and upon being circulated around and between the glass sheets will effect the washing of the opposite surfaces thereof. The washing solution passes from the opposite end of the tank, preferably adjacent the top thereof, through a pipe 30 leading back to the heating tank 28 from which it can be repumped into the tank 23.

The detergent bath 25 is preferably maintained at a temperature of 165 and 175 degrees Fahrenheit and the glass sheets allowed to remain therein for about one minute.

After the glass sheets 10 have been sufficiently washed, they are removed from the tank 23 and immersed in a second tank wherein they are subjected to a rinsing operation in which city water is preferably used. The second tank may be identical with that of tank 23 in Fig. 2, and the rinse water circulated therethrough in the same manner as the washing solution. The temperature of the rinse bath is preferably maintained at a temperature from 140 to 150 degrees Fahrenheit.

Figure 3:
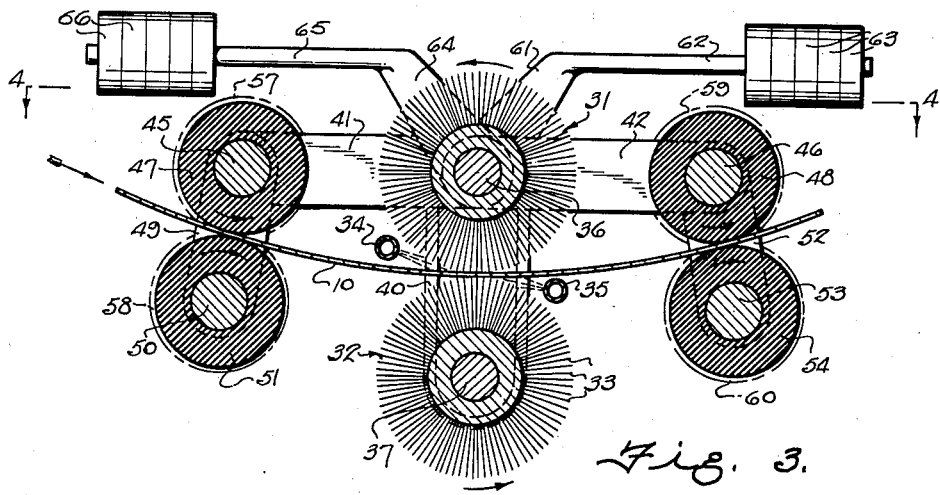
Fig. 3 is a vertical longitudinal sectional view through an apparatus provided for effecting the final brushing and rinsing of the glass sheets.
Figure 4:
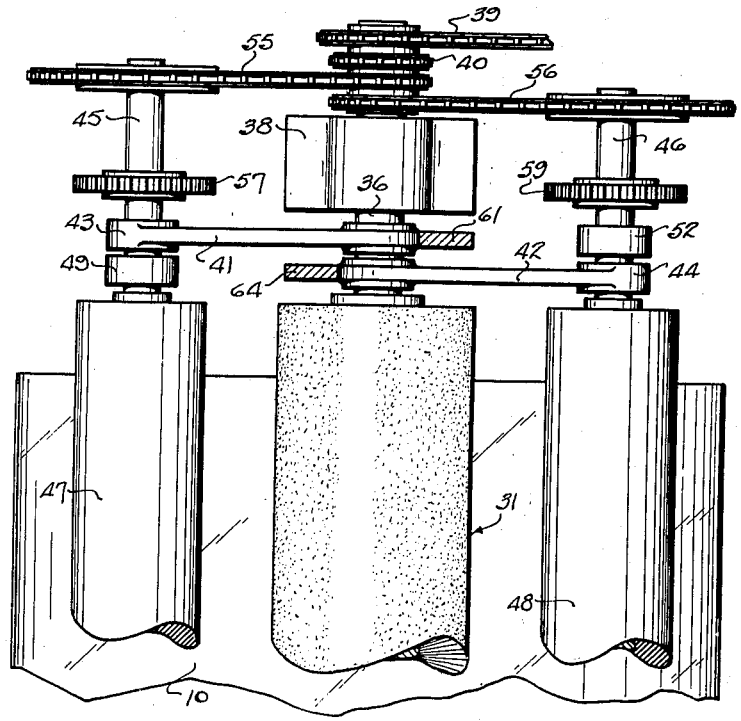
Fig. 4 is a horizontal sectional view taken substantially on line 4—4 of Fig. 3.

After the glass sheets 10 have been sufficiently rinsed, they are removed from the rinse bath and passed one at a time through the apparatus illustrated in Figs. 3 and 4, wherein they are subjected to a final brushing and rinse treatment. This apparatus comprises a pair of horizontal superimposed washing brushes 31 and 32 having the usual bristles 33 and between which the glass sheets are horizontally passed so that the opposite surfaces thereof may be acted upon simultaneously. This brushing and rinse operation is preferably accomplished with the use of pure (distilled) water which is applied to opposite surfaces of the sheet as it is subjected to the action of the brushes 31 and 32 through spray pipes or the like 34 and 35.

The washing brushes 31 and 32 are carried by shafts 36 and 37 respectively, rotatably supported at each end in a stationary bearing standard 38 and preferably driven in the same direction as indicated by the arrows in Fig. 3. One of the brushes, and as here shown brush 31, may be driven by a suitable chain and sprocket drive or the like 39 and the brush 32 driven from brush 31 by a sprocket chain 40 trained about sprockets keyed to the brush shafts 36 and 37.

Pivotally carried by the shaft 36 of brush 31 at each end thereof are the oppositely projecting, substantially horizontal arms 41 and 42 provided at their outer ends with bearings 43 and 44 within which are journaled the horizontal shafts 45 and 46 respectively carrying guide rolls 47 and 48. Loosely carried upon the shaft 45, at each end thereof, is a depending hanger 49, and extending between and rotatably carried by said hangers at the lower ends thereof is the shaft 50 of a guide roll 51. Loosely carried at the opposite ends of shaft 46 are similar depending hangers 52 rotatably supporting at their lower ends the shaft 53 of a guide roll 54.

With the construction and arrangement above described, it will be seen that the two lower guide rolls 51 and 54 are permitted to swing freely horizontally about the axes of rotation of the upper guide rolls 47 and 48 and also that the two pairs of guide rolls 47—51 and 48—54 can move freely vertically relative to one another and also with respect to the washing brushes 31 and 32. The upper guide rolls 47 and 48 are driven from the brush shaft 36 by sprocket chains or the like 55 and 56 respectively, while the lower guide rolls 51 and 54 are driven from the upper guide rolls 47 and 48 respectively by the intermeshing gears 57 and 58 keyed to shafts 45 and 50 and intermeshing gears 59 and 60 keyed to shafts 46 and 53.

For the purpose of counterbalancing the guide rolls 47—51, there is formed integral with the inner end of the substantially horizontal arm 41 an upwardly and outwardly projecting crank 61 terminating in a substantially horizontal rod 62 carrying a plurality of counterweights 63. The guide rolls 48—54 are similarly counterbalanced by a crank 64 formed integral with the inner end of arm 42 and terminating in a substantially horizontal rod 65 carrying a plurality of counterweights 66.

As shown in Fig. 3, the bent or curved sheets of glass 10 are adapted to be passed horizontally one at a time between the washing brushes 31 and 32. The glass sheet is supported at opposite sides of the washing brushes by the guide rolls which also serve to guide and feed the sheet between said brushes. The axis of bend of the glass sheet extends parallel with the axes of rotation of the washing brushes 31 and 32 and the sheet is caused to move through a curved path corresponding to the curvature thereof, whereby the succeeding opposite surface portions of the sheet contacted by the brushes will always be disposed substantially parallel with respect to said brushes. In this way, a thorough, efficient treatment of the opposite surfaces of the glass sheet can be accomplished without placing any strain upon the glass which might tend to cause breakage thereof.

Since the lower guide rolls 51 and 54 are free to swing horizontally about the axes of the upper guide rolls 47 and 48 and the two pairs of guide rolls also permitted to move freely vertically as a unit relative to one another about the shaft 36 of washing brush 31, the said guide rolls can automatically adjust themselves to take care of glass sheets having different curvatures. If all of the glass sheets passed through the apparatus were uniformly bent on an arc of a circle, the guide rolls could be mounted in a fixed position. However, inasmuch as the glass sheets treated may be bent on different radii and also not bent on the radius of a true circle, the particular mounting of the guide rolls herein disclosed is important in that the rolls can accommodate themselves to a particular curve and remain parallel with the glass sheet as it passes therebetween.

The guide rolls are preferably formed of rubber, rubber composition, or the like, and act in the nature of squeegee rolls to remove excess water from the glass sheet. By rotating the washing brushes 31 and 32 in the same direction as indicated by the arrows in Fig. 3, a steadier and more even and uniform movement of the glass sheet between the washing brushes can be obtained. That is to say, if the two washing brushes were both rotated in the same direction as the travel of the glass sheet, they would tend to force the sheet ahead; whereas, if they were both rotated in a direction opposite to the direction of travel of the sheet, they would tend to retard the forward movement thereof. However, by rotating the brushes in the same direction, the two forces which tend to push the sheet ahead on the one hand and retard the forward movement on the other will be offset or neutralized, and in this way a smoother, steadier forward travel of the sheet will be effected. The method and apparatus herein disclosed is not restricted to the washing of glass sheets or plates but may be employed in the washing of other sheet material.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for washing bent or curved sheets or plates of glass and the like, a pair of horizontal rotary washing brushes arranged one above the other and between which the sheet is passed, with its axis of bend extending parallel with the axes of rotation of said brushes, a pair of horizontal superposed guide rolls arranged at each side of said brushes for guiding said sheet through a curved path corresponding to the curvature thereof as it passes between said brushes whereby the succeeding opposite surface portions of said sheet contacted by said brushes will be maintained substantially parallel with respect to the said brushes, and means for mounting the lower guide roll of each pair for horizontal swinging movement about the axis of rotation of the respective upper guide roll.

2. In apparatus for washing bent or curved sheets or plates of glass and the like, a pair of horizontal rotary washing brushes arranged one above the other and between which the sheet is passed, with its axis of bend extending parallel with the axes of rotation of said brushes, shafts for said brushes, a pair of horizontal superposed guide rolls carried by the shaft of the upper washing brush and arranged at each side of said brushes for guiding said sheet through a curved path corresponding to the curvature thereof as it passes between said brushes whereby the succeeding opposite surface portions of said sheet contacted by said brushes will be maintained substantially parallel with respect to the said brushes, and means for mounting the lower guide roll of each pair for horizontal swinging movement about the axis of rotation of the respective upper guide roll.

3. In apparatus for washing bent or curved sheets or plates of glass and the like, a pair of horizontal rotary washing brushes arranged one above the other and between which the sheet is passed, with its axis of bend extending parallel with the axes of rotation of said brushes, shafts for said brushes, a pair of horizontal superposed guide rolls pivotally carried by the shaft of the upper washing brush and arranged at each side of said brushes for guiding said sheet through a curved path corresponding to the curvature thereof as it passes between said brushes whereby the succeeding opposite surface portions of said sheet contacted by said brushes will be maintained substantially parallel with respect to the said brushes, shafts for said guide rolls, and means for mounting the lower guide roll of each pair upon the shaft of the respective upper guide roll for horizontal swinging movement about the axis of rotation of said upper guide roll.

4. In apparatus for washing bent or curved sheets or plates of glass and the like, a pair of horizontal rotary washing brushes arranged one directly above the other and between which the sheet is passed, with its axis of bend extending parallel with the axes of rotation of said brushes, a pair of horizontal superposed guide rolls arranged at each side of said brushes for guiding said sheet through a curved path corresponding to the curvature thereof as it passes between said brushes whereby the succeeding opposite surface portions of said sheet contacted by said brushes will be maintained substantially parallel with respect to the said brushes, means for mounting each pair of guide rolls for vertical swinging movement about the axis of rotation of the upper washing brush, means for mounting the lower guide roll of each pair for horizontal swinging movement about the axis of rotation of the respective upper guide roll, means for positively driving said washing brushes in the same direction, and means for positively driving the guide rolls of each pair in opposite directions to advance the sheet between the said brushes.

5. In apparatus for washing bent or curved sheets or plates of glass and the like, a pair of horizontal rotary washing brushes arranged one above the other and between which the sheet is passed, with its axis of bend extending parallel with the axes of rotation of said brushes, shafts for said brushes, oppositely projecting substantially horizontal arms pivotally carried by the shaft of the upper washing brush at each end thereof, a horizontal shaft rotatably carried at the outer ends of the horizontal arms at each side of said washing brush, horizontal guide rolls carried by said last-named shafts, depending hangers loosely carried upon said last-named shafts at the opposite ends thereof, and guide rolls rotatably carried by said depending hangers for horizontal swinging movement about the axis of rotation of the respective upper guide roll.

6. In apparatus for washing bent or curved sheets or plates of glass and the like, a pair of horizontal rotary washing brushes arranged one above the other and between which the sheet is passed, with its axis of bend extending parallel with the axes of rotation of said brushes, shafts for said brushes, oppositely projecting substantially horizontal arms pivotally carried by the shaft of the upper washing brush at each end thereof, a horizontal shaft rotatably carried at the outer ends of the horizontal arms at each side of said washing brush, horizontal guide rolls carried by said last-named shafts, depending hangers loosely carried upon said last-named shafts at the opposite ends thereof, guide rolls rotatably carried by said depending hangers for horizontal swinging movement about the axis of rotation of the respective upper guide roll, upwardly and outwardly projecting cranks carried at the inner ends of said substantially horizontal arms terminating in substantially horizontal rods, and counterweights carried by said rods.

7. In apparatus for washing bent or curved sheets or plates of glass and the like, a pair of horizontal rotary washing brushes arranged one above the other and between which the sheet is passed, with its axis of bend extending parallel with the axes of rotation of said brushes, a pair of horizontal superposed guide rolls arranged at each side of said brushes for guiding said sheet through a curved path corresponding to the curvature thereof as it passes between said brushes whereby the succeeding opposite surface portions of said sheet contacted by said brushes will be maintained substantially parallel with respect to the said brushes, means for mounting each pair of guide rolls for vertical swinging movement about the axis of rotation of the upper washing brush, and means for mounting the lower guide roll of each pair for horizontal swinging movement about the axis of rotation of the respective upper guide roll.

CONRAD B. SCHAFER.